(12) United States Patent
Li et al.

(10) Patent No.: US 11,620,737 B2
(45) Date of Patent: Apr. 4, 2023

(54) SYSTEM AND METHOD FOR INDOOR IMAGE INPAINTING UNDER MULTIMODAL STRUCTURAL GUIDANCE

(71) Applicant: Samsung Electronics Co., Ltd., Suwon-si (KR)

(72) Inventors: Wenbo Li, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/504,221

(22) Filed: Oct. 18, 2021

(65) Prior Publication Data

US 2022/0301117 A1 Sep. 22, 2022

Related U.S. Application Data

(60) Provisional application No. 63/164,380, filed on Mar. 22, 2021.

(51) Int. Cl.
| | |
|---|---|
| *G06K 9/00* | (2022.01) |
| *G06T 5/00* | (2006.01) |
| *G06K 9/62* | (2022.01) |
| *G06V 10/22* | (2022.01) |
| *G06V 30/262* | (2022.01) |

(52) U.S. Cl.
CPC .............. *G06T 5/005* (2013.01); *G06K 9/628* (2013.01); *G06K 9/6232* (2013.01); *G06V 10/22* (2022.01); *G06V 30/274* (2022.01)

(58) Field of Classification Search
CPC ...... G06T 5/005; G06K 9/6232; G06K 9/628; G06V 10/22; G06V 30/274; G06V 10/82
See application file for complete search history.

(56) References Cited

U.S. PATENT DOCUMENTS

| | | | |
|---|---|---|---|
| 8,731,324 B1 | 5/2014 | Huang et al. | |
| 10,290,085 B2 | 5/2019 | Lin et al. | |
| 10,878,575 B2 | 12/2020 | Lin et al. | |
| 10,922,793 B2 | 2/2021 | Baek et al. | |
| 11,449,079 B2* | 9/2022 | Lin | G05D 1/0016 |
| 2015/0170006 A1* | 6/2015 | Cohen | G06T 7/11 |
| | | | 382/180 |

(Continued)

FOREIGN PATENT DOCUMENTS

| | | |
|---|---|---|
| KR | 10-2167835 B1 | 10/2020 |
| WO | 2020101246 A1 | 5/2020 |

OTHER PUBLICATIONS

Pathak et al., "Context Encoders: Feature Learning by Inpainting", 2016 IEEE Conference on Computer Vision and Pattern Recognition, Jun. 2016, 9 pages.

(Continued)

*Primary Examiner* — Dhaval V Patel

(57) ABSTRACT

An inpainting method includes obtaining image information at an electronic device, where the image information identifies an area corresponding to a removed object within an image. The method also includes reconstructing the area corresponding to the removed object by (i) applying a semantic mask and a surface normal map to identify and rank neighboring contexts of the area and (ii) sampling, using an attention mechanism, the ranked contexts to generate pixel information for the area. The method further includes rendering the image with the reconstructed area.

20 Claims, 10 Drawing Sheets

(56) References Cited

U.S. PATENT DOCUMENTS

2019/0057507 A1* 2/2019 El-Khamy ............... G06T 5/20
2020/0242771 A1   7/2020 Park et al.
2021/0158491 A1   5/2021 Li et al.
2022/0012903 A1* 1/2022 Vyas ..................... G06T 5/001

OTHER PUBLICATIONS

Taira et al., "Is This the Right Place? Geometric-Semantic Pose Verification for Indoor Visual Localization", 2019 IEEE/CVF International Conference on Computer Vision (ICCV), Oct. 2019, 11 pages.

International Search Report and Written Opinion of the International Searching Authority dated Jun. 22, 2022 in connection with International Patent Application No. PCT/KR2022/003911, 8 pages.

Nazeri et al., "EdgeConnect: Generative Image Inpainting with Adversarial Edge Learning", https://arxiv.org/abs/1901.00212, Jan. 2019, 17 pages.

Liu et al., "Rethinking Image Inpainting via a Mutual Encoder-Decoder with Feature Equalizations", 2020 European Conference on Computer Vision (ECCV), Jul. 2020, 16 pages.

Xie et al., "Image Inpainting with Learnable Bidirectional Attention Maps", 2019 IEEE/CVF International Conference on Computer Vision (ICCV), Oct. 2019, 18 pages.

Yu et al., "Free-Form Image Inpainting with Gated Convolution", 2019 IEEE/CVF International Conference on Computer Vision (ICCV), Oct. 2019, 17 pages.

Yi et al., "Contextual Residual Aggregation for Ultra High-Resolution Image Inpainting", 2020 IEEE/CVF Conference or Computer Vision and Pattern Recognition (CVPR), May 2020, 22 pages.

Hong et al., "Deep Fusion Network for Image Completion", Association for Computer Machinery, Multimedia Conference, Apr. 2019, 13 pages.

Zeng et al., "High-Resolution Image Inpainting with Iterative Confidence Feedback and Guided Upsampling", 2020 European Conference on Computer Vision (ECCV), Jul. 2020, 17 pages.

* cited by examiner

SYSTEM AND METHOD FOR INDOOR IMAGE INPAINTING UNDER MULTIMODAL STRUCTURAL GUIDANCE

CROSS-REFERENCE TO RELATED APPLICATION AND PRIORITY CLAIM

This application claims priority under 35 U.S.C. § 119(e) to U.S. Provisional Patent Application No. 63/164,380 filed on Mar. 22, 2021, which is hereby incorporated by reference in its entirety.

TECHNICAL FIELD

This disclosure relates generally to imaging systems. More specifically, this disclosure relates to a system and method for indoor image inpainting based on multimodal structural guidance to adjust content in images.

BACKGROUND

Mobile electronic devices, such as smartphones and tablet computers, have become the most prevalent device type for capturing, uploading, and sharing digital images. In many instances, users wish to edit their digital images before uploading or sharing. This is often due to difficulty in capturing "perfect" digital images (as judged by the users) at manageable time costs. Unwanted object removal or other unwanted content removal is one type of editing function that users typically wish to perform prior to uploading or sharing digital images. For example, users may wish to remove unwanted people or other unwanted objects from digital images. To perform unwanted content removal, a user may typically identify a region of a digital image in which at least one object is to be removed and replaced. A convolution neural network is then used to fill replacement content into that region, where the replacement content is typically based on other content remaining within the digital image. Unfortunately, convolution neural networks often produce poor results when filling replacement content into regions in which unwanted content is being removed. For instance, convolution neural networks often generate visible artifacts in the edited digital images.

SUMMARY

This disclosure relates to a system and method for inpainting an image of an indoor area based on multimodal structural guidance to adjust content in an image.

In a first embodiment, an inpainting method includes obtaining image information at an electronic device, where the image information identifies an area corresponding to a removed object within an image. The method also includes reconstructing the area corresponding to the removed object by (i) applying a semantic mask and a surface normal map to identify and rank neighboring contexts of the area and (ii) sampling, using an attention mechanism, the ranked contexts to generate pixel information for the area. The method further includes rendering the image with the reconstructed area.

In a second embodiment, an apparatus includes at least one processor configured to obtain image information, where the image information identifies an area corresponding to a removed object within an image. The at least one processor is also configured to reconstruct the area corresponding to the removed object. To reconstruct the area, the at least one processor is configured to (i) apply a semantic mask and a surface normal map to identify and rank neighboring contexts of the area and (ii) sample, using an attention mechanism, the ranked contexts to generate pixel information for the area. The at least one processor is further configured to render the image with the reconstructed area.

In a third embodiment, a non-transitory computer readable medium contains instructions that when executed cause at least one processor to obtain image information, where the image information identifies an area corresponding to a removed object within an image. The medium also contains instructions that when executed cause the at least one processor to reconstruct the area corresponding to the removed object. The instructions that when executed cause the at least one processor to reconstruct the area include instructions that when executed cause the at least one processor to (i) apply a semantic mask and a surface normal map to identify and rank neighboring contexts of the area and (ii) sample, using an attention mechanism, the ranked contexts to generate pixel information for the area. The medium further contains instructions that when executed cause the at least one processor to render the image with the reconstructed area.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B,"

"at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch).

Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
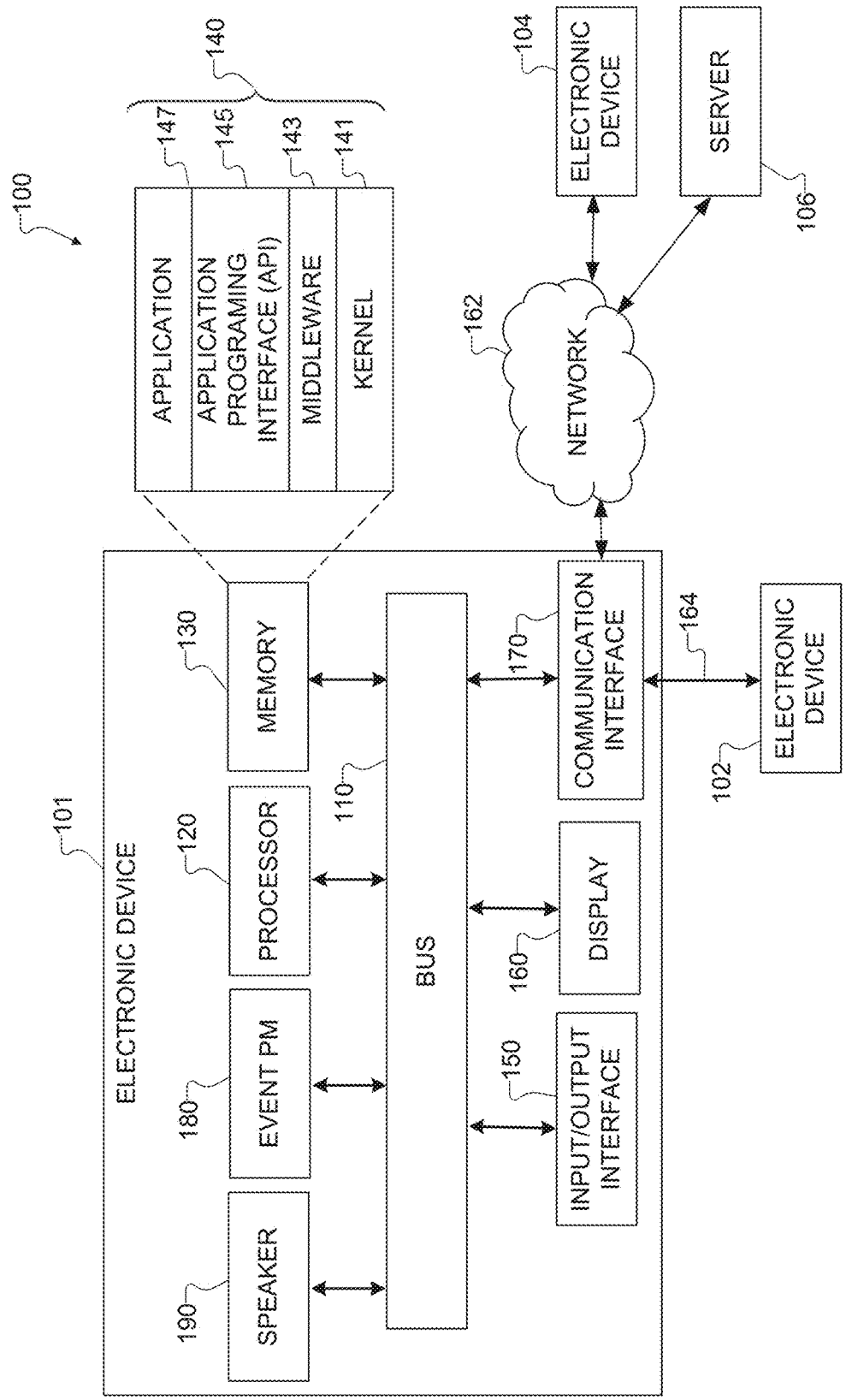
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, mobile electronic devices, such as smartphones and tablet computers, have become the most prevalent device type for capturing, uploading, and sharing digital images. In many instances, users wish to edit their digital images before uploading or sharing, and unwanted object removal or other unwanted content removal is one type of editing function that users typically wish to perform prior to uploading or sharing digital images. Additionally, many mobile devices include depth cameras, which enable users to virtually visualize desired appliances or furniture in their own homes. However, a virtual appliance or virtual furniture may only be placed in a vacant area within an image of a desired room for placement. In some instances, the desired area for placement is occupied by another object, such as another appliance or piece of furniture. Moreover, the shape of the replaced object may not match the shape of the desired object. Therefore, placement of the desired object overlaid onto the current object may cause a portion of the current object to remain uncovered in the image.

To perform unwanted content removal of an exposed portion of an existing object, a user may typically identify portions of the image to be removed and replaced. A convolution neural network (CNN) is used to fill replacement content into that region, where the replacement content is typically based on other content remaining within the digital image. Unfortunately, removing an object from an image can result in a hole remaining on the image plane. The hole may be corrected through image inpainting.

Image inpainting covers a wide range of applications, from restoration of damaged paintings and photographs to the removal or replacement of selected objects within images. Inpainting an image typically includes restoring textures for corrupted image regions with non-corrupted regions as contexts. Certain image inpainting methods may utilize a semantic mask. The semantic mask and a surface normal map contain salient structures and edges of objects. The structures and edges of hole regions of the semantic mask and surface normal map can be easily restored by users or a model. The restored semantic mask and surface normal map can also be used as multimodal structural guidance for the inpainting process for indoor images. However, making an effective use of the semantic mask and surface normal map as auxiliary input can be a problem. Certain methods fail because convolution operations and attention mechanisms in these methods fail to sample sufficient relevant contexts for inpainting and instead sample many irrelevant contexts.

Embodiments of this disclosure provide multimodal structural guidance (MSG) that performs inpainting on an indoor image. The MSG, which can be based on an artificial intelligence (AI) agent, is configured to perform an MSG-based convolution (MSG-Conv) operation to precisely sample relevant local contexts. The MSG-Conv operation can precisely avoid sampling false-relevant contexts residing across sharp edges. The MSG-Conv operation can also sample sufficient relevant contexts, even in the presence of occlusions of indoor images, due to an adaptively adjustable receptive field. When a total of nearby relevant contexts is insufficient, the receptive field of the MSG-Conv operation can be dynamically and boldly enlarged. In some embodiments, an MSG-based attention mechanism (MSG-Attn) is configured to sample relevant distant global contexts. This allows the MSG-Attn to sample the most relevant global contexts to restore one or more hole regions. The global sampling increases the risk of encountering false-relevant contexts of different semantic classes that share similar colors and repeated structures. The MSG-Attn can block out innate disturbances of the indoor images by checking a relevance measured according to the semantic mask and the surface normal map. Embodiments of the present disclosure enable AI system to remove and replace objects in an image by removing a first object and rendering the image without the removed object to enable placement of a new object. The system provides the advantages of obtaining image information at an electronic device, wherein the image information identifies an area corresponding to a removed object within an image; and reconstructing the area corresponding to the removed object by: applying a semantic mask and a surface normal map to identify and rank neighboring contexts of the area; and sampling, using an attention mechanism, the ranked contexts to generate pixel information for the area. By using the semantic mask and attention mechanism, the AI system is able to render the image with a reconstructed area.

FIG. 1 illustrates an example network configuration 100 in accordance with this disclosure. The embodiment of the network configuration 100 shown in FIG. 1 is for illustration only. Other embodiments could be used without departing from the scope of this disclosure.

As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Certain deep learning methods for image inpainting sample and aggregate contexts from non-hole regions to fill hole regions. However, basic neural network operations are blind to the relevance of contexts, which leave breaches for false-relevant contexts to negatively impact inpainting quality.

Embodiments of this disclosure use multimodal structural guidance (MSG) to address indoor image inpainting issues. For example, to reduce or eliminate the "relevance blindness" towards the contexts, a principle of relevance grading is introduced for determining the relevance between any two locations on an image plane using MSG. According to this principle, the relevance levels between two locations can be graded into multiple levels, such as "good" (same semantic class and same surface), "fair" (same semantic class and different surfaces), and "bad" (different semantic classes). In some embodiments, based on the relevance awareness, a convolution operation (MSG-Conv) and an attention mechanism (MSG-Attn) are redesigned to sufficiently sample both the local and global relevant contexts and lead to reasonable structures and frames.

In some embodiments, the MSG-Conv operation involves a hyperparameter $\theta$, which controls the lower limit of contexts to be sampled. Unlike conventional convolutions using a fixed kernel size, the kernel size of the MSG-Conv operation can be moderately enlarged if a total of nearby relevant contexts cannot reach $\theta$. Within an MSG-Conv kernel, the "good" contexts can be sampled first inside and out. Only after all "good" contexts are sampled and $\theta$ is still not reached may the MSG-Conv operation sample the "fair" contexts. The "bad" contexts may never be sampled even if $\theta$ cannot be reached. During the bold enlargement of the kernel size, the MSG acts as a sentinel, leading to precise and sufficient sampling of the relevant contexts. The MSG-Attn improves the reliability of attention weight estimation by incorporating the relevance awareness, which allows the MSG-Attn to focus on the most relevant contexts. Specifically, if there exist any "good" contexts for a location, the attention weights for the other contexts may be zeroed out in some embodiments. Only when no "good" contexts exist may the "fair" ones receive attention.

In some embodiments, the MSG-Conv and MSG-Attn enable an enhanced generalization capability because auxiliary modalities are not processed by any model parameter and instead may only be used for measuring the relevance between locations, which is basically related to the relative values of the auxiliary modalities and has little to do with their absolute values. Thus, the MSG-Conv and MSG-Attn avoid the generalization issue caused by distribution misalignment between training and test data. For example, the MSG-Conv and MSG-Attn can process new semantic classes that are unseen in the training data. The MSG-Conv and MSG-Attn also tolerate an imprecise estimation of the surface normal map due to the lack of camera parameters. In some embodiments, based on MSG-Conv and MSG-Attn, a lightweight model is configured for indoor image inpainting.

Figure 2:
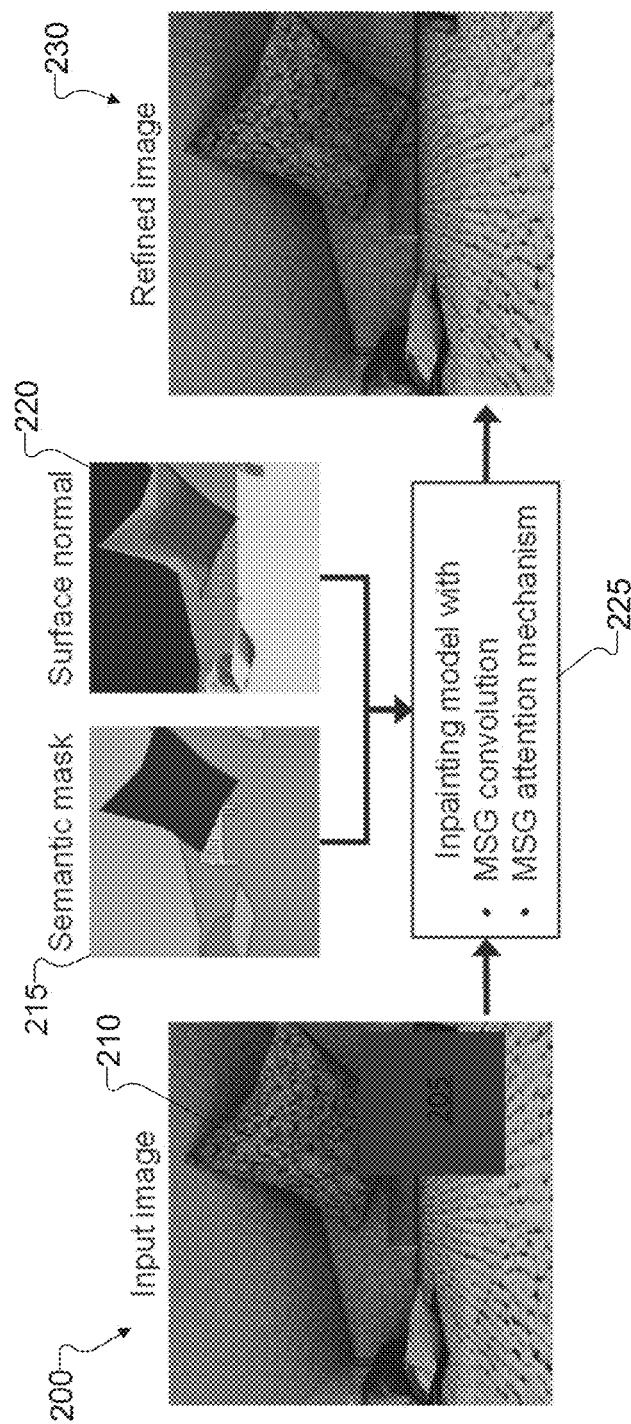
FIG. 2 illustrates an example layout-guided inpainting process in accordance with this disclosure.

FIG. 2 illustrates an example layout-guided inpainting process 200 in accordance with this disclosure. For ease of explanation, the layout-guided inpainting process 200 may be described as being performed by the electronic device 101 in the network configuration 100 of FIG. 1. However, the layout-guided inpainting process 200 may be performed by any other suitable device (such as the server 106) and in any other suitable system.

In the example shown in FIG. 2, an input image 200 includes a hole region 205 resulting from a removal of a first object. The input image 200 can be of an indoor area. The indoor area can be an area within an interior of a building, such as an area within an interior of an apartment, a home, an office, a store, an arena, a garage, a warehouse, or the like. The image also includes a second object 210. Auxiliary multimodal structures, such as a semantic mask 215 and a surface normal map 220, guide an inpainting model 225 to generate one or more reasonable structures and/or frames for the hole region 205. Using multimodal structural guidance (MSG), the inpainting model 225 can precisely sample relevant locations from regions outside the hole region 205 on the image plane and project the information of the sampled relevant contexts to generate content for the hole region 205. This can be done for a single hole region 205 or for multiple hole regions 205. The inpainting model 225 performs an MSG convolution and applies an MSG attention mechanism to produce a refined image 230.

In some embodiments, under MSG, a relevance between two locations on the image plane can be graded into multiple levels based on their affiliations with semantic classes and surfaces. In particular embodiments, three levels are defined as (i) "good" (same semantic class and surface), (ii) "fair" (same semantic class and different surfaces), and (iii) "bad" (different semantic classes). This principle effectively blocks out false-relevant contexts that prevent achieving reasonable structures/frames of indoor images. Scenarios in which false-relevant contexts may occur include different semantic classes sharing similar colors (such as white walls and shutters) or uni-color surfaces of the same semantic class showing different colors because of lighting effects (such as two uni-color wall surfaces showing different colors under a light).

In some embodiments, two indicator functions $\mathbb{1}^m(i,j)$ and $\mathbb{1}^n(i,j)$ are defined for deciding whether two locations belong to the same semantic class and the same surface, respectively. The term m(i) denotes a sematic class label at location i of a semantic mask. The term n(i) denotes a vector at location i of a surface normal map. The indicator functions $\mathbb{1}^m(i,j)$ and $\mathbb{1}^n(i,j)$ may be expressed according to:

$$\mathbb{1}^m(i,j) = \delta(m(i)=m(j)) \quad (1)$$

$$\mathbb{1}^n(i,j) = \delta(\cos(n(i),n(j)) \geq \eta) \quad (2)$$

In Equations (1) and (2), $\delta(\cdot)$ is a delta function, and $\cos(\cdot)$ is a cosine similarity function. The term $\eta$ denotes the threshold of the cosine similarity between two normal vectors of the same surface. In some examples, $\eta=0.7$.

In some embodiments, the input image 200 is processed through a layout-guided pre-processing model such as disclosed in U.S. patent application Ser. No. 17/503,169 entitled SYSTEM AND METHOD FOR IMAGE INPAINTING BASED ON LAYOUT-GUIDED PRE-PROCESSING ATTENTION MECHANISM, which claims priority under 35 U.S.C. § 119(e) to U.S. Provisional Patent Application No. 63/115,428 filed on Nov. 18, 2020, the contents of which are hereby incorporated by reference.

Although FIG. 2 illustrates one example of a layout-guided inpainting process 200, various changes may be made to FIG. 2. For example, the actual contents of the images being processed can vary widely.

Figure 3:
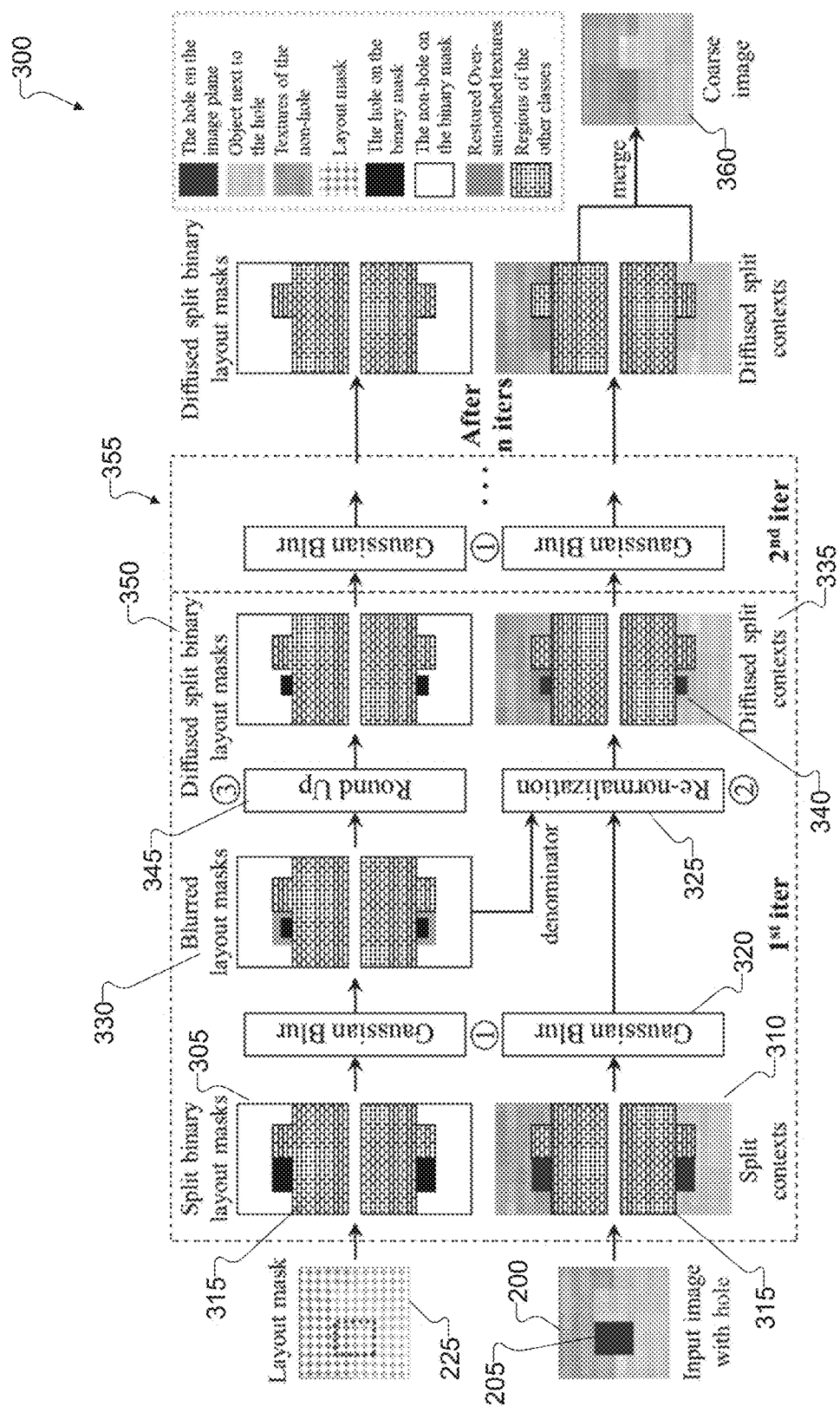
FIG. 3 illustrates an example layout-guided preprocessing model in accordance with this disclosure.

FIG. 3 illustrates an example layout-guided preprocessing model 300 in accordance with this disclosure. For ease of explanation, the layout-guided preprocessing model 300 (which may also be referred to as a contextually corresponding diffusion model) may be described as being used by the electronic device 101 in the network configuration 100 of FIG. 1 while performing a layout-guided inpainting process 200 of FIG. 2. However, the layout-guided preprocessing model 300 may be used by any other suitable device (such as the server 106) and in any other suitable system, and the layout-guided preprocessing model 300 may be used during any other suitable layout-guided inpainting process.

As shown in FIG. 3, the layout-guided preprocessing model 300 is configured to perform an iterative diffusing process including a Gaussian blur and re-normalization until a hole within an image is corrected. The layout-guided preprocessing model 300 can restore coarse textures for hole regions in an efficient nonparametric fashion. Specifically, the processor 120 uses a layout mask to guide the preprocessing model 300 to propagate textures of non-hole regions to hole regions of the same object categories. The iterative pipeline of the layout-guided preprocessing model 300 contains three steps within each iteration, and three semantic classes are marked using different shades here.

In the example shown in FIG. 3, the layout-guided preprocessing model 300 receives the image 200 and the layout mask 225, and the layout-guided preprocessing model 300 applies split binary layout masks to the inputs. The image plane is split according to the object category distribution, and the image plane is split to shield against artifacts brought about by mixing different object categories. The layout mask 225 is split into split binary layout masks 305, and the input image 200 is split into split contexts 310. In the example depicted in FIG. 3, regions 315 that belong to other object categories are marked with brick patterns, which may be fixed to zero constantly throughout the preprocessing process. The split binary layouts represent values 1 and 0, respectively. The gray in the blurred layouts represent values between 0 and 1.

The layout-guided preprocessing model 300 aggregates neighboring contexts as the content for each hole region. On the image plane, the more-distant a contextual non-hole region is to a hole region, the lower impact the non-hole region should have on the hole region. In some embodiments, the distance may be determined as a Euclidean distance. The layout-guided preprocessing model 300 includes a Gaussian Blur module 320 that utilizes a two-dimensional (2D) Gaussian kernel to perform a Gaussian Blur process in step ①. Weights of the 2D Gaussian kernel may follow a 2D Gaussian distribution, with a center placed at the square kernel center. For each hole region, the hole region's contexts can be aggregated by performing the 2D convolution centered on the hole region with the 2D Gaussian kernel. In particular embodiments, the Gaussian Blur can be performed according to:

$$g(W, H) = \frac{1}{\sum_{i}^{K}\sum_{j}^{K} W_{i,j}} \sum_{i}^{K}\sum_{j}^{K} (W \odot H)_{i,j} \quad (3)$$

In Equation (3), $W \in \mathbb{R}_{>0}^{K \times K}$ represents a 2D Gaussian kernel that has a K×K matrix with each entry being positive, and H represents a K×K slice of an input (namely the split contexts 310 or split binary layout mask 305) centered on a current bad location. Also, $\odot$ denotes the Hadamard product, and g(W, H) represents the Gaussian blur operation that includes two sub-operations (namely the Hadamard product between W and H and the normalization through the division of the Hadamard product by the grand sum of W).

The context aggregation for a specific hole region can be exclusive to only the non-hole regions. However, the normalization operation of the Gaussian blur violates this rule because the normalization operation considers all regions indiscriminately. Therefore, the layout-guided preprocessing model 300 re-normalizes the results of Gaussian blur by eliminating influences from other hole regions. The layout-guided preprocessing model 300 includes a re-normalization module 325, and the layout-guided preprocessing model 300 receives the blurred layout masks 330 output by Gaussian Blur module 320 as the denominator for the re-normalization in step ②. In particular embodiments, the aggregation results may be constructed according to:

$$\Omega = \{i,j | H_{i,j}^s = 1\} \quad (4)$$

The blurred structure can be computed by inserting $H^S$ into Equation (3), removing the expression in the Hadamard product operation involving $H_{i,j}{}^S=0$, and reducing the expression in the Hadamard product operation involving $H_{i,j}{}^S=1$. This can be expressed as follows:

$$g(W, H^S) = \frac{1}{\sum_i^K \sum_j^K W_{i,j}} \sum_{i,j \in \Omega} W_{i,j} \quad (5)$$

The re-normalized aggregation result h' for a specific bad region (hole) can be computed by dividing the result of Equation (3) by the result of Equation (5). This can be expressed as follows:

$$h' = \frac{1}{\sum_{i,j \in \Omega} W_{i,j}} \sum_i^K \sum_j^K (W \odot H)_{i,j} \quad (6)$$

The aggregation results constitute the diffused split contexts 335.

As shown in the example of FIG. 3, in the diffused split contexts 330, a portion of the hole 205 is corrected or blurred 340 into the rest of the image 205. The corrected or blurred portion of the image 205 may not correct the entire hole 205. Therefore, the layout-guided preprocessing model 300 is configured to repeat the Gaussian blur and renormalization until the entire hole 205 is corrected.

The layout-guided preprocessing model 300 further includes a round up module 345 configured to generate diffused split binary layout masks 350. In step ③, the blurred layout masks 330 can be rounded up to generate the diffused split binary layout masks 350. The diffused split contexts 335 and the diffused split binary layout masks 350 are provided to the next iteration 355 of the process as inputs. After several iterations, all coarse textures can be restored in the diffused split contexts 335', which is merged to form a coarse image 360.

Although FIG. 3 illustrates one example of a layout-guided preprocessing model 300, various changes may be made to FIG. 3. For example, the actual contents of the contexts and masks can vary widely based on the contents of the images being processed.

Figure 4:
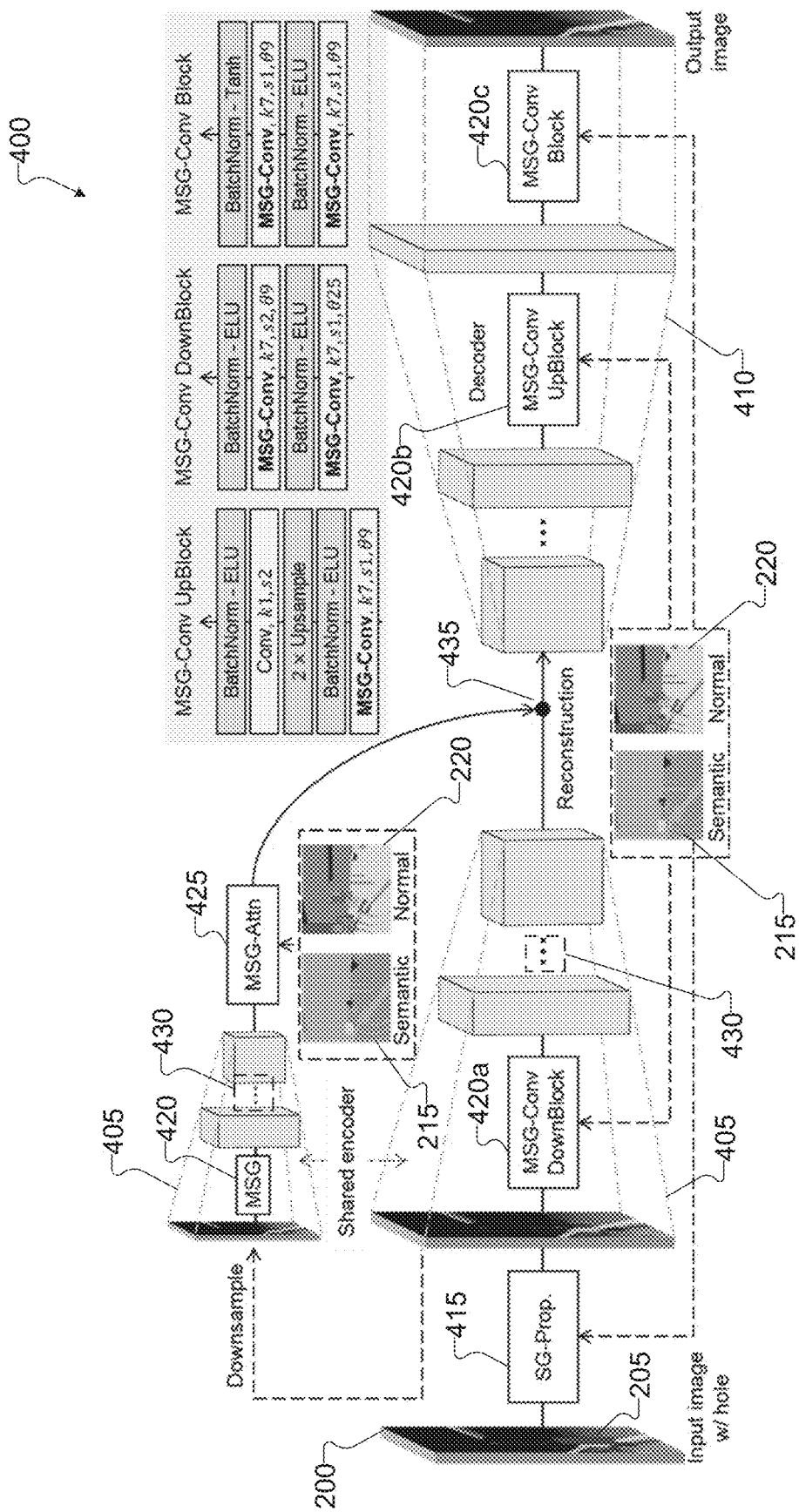
FIG. 4 illustrates an example inpainting model with an encoder-decoder architecture in accordance with this disclosure.

FIG. 4 illustrates an example inpainting model 400 with an encoder-decoder architecture in accordance with this disclosure. For ease of explanation, the inpainting model 400 with the encoder-decoder architecture may be described as being used by the electronic device 101 in the network configuration 100 of FIG. 1. However, the inpainting model 400 with the encoder-decoder architecture may be used by any other suitable device (such as the server 106) and in any other suitable system.

In the example shown in FIG. 4, the inpainting model 400 includes an encoder 405 and a decoder 410. The input image 200 (having the hole region 205) is received by the inpainting model 400, which is configured to perform an MSG process. Although one hole region 205 is depicted, embodiments with more the one hole region 205 could be used in which the inpainting model 400 is configured to correct the multiple hole regions 205. In this example, the MSG process includes three building blocks, namely a semantic-guided propagation module (SG-Prop) 415, an MSG convolution (MSG-Conv) 420, and an MSG attention mechanism (MSG-Attn) 425.

The SG-Prop 415 estimates a rough appearance of the hole region 205, which significantly relieves a burden for the inpainting model 400 to deal with void hole regions. For example, the SG-Prop 415 may propagate oversmoothed textures or colors from regions outside the hole region 205 into the hole region 205, such as by propagating pixel information into the hole region 205. In some embodiments, the propagation process is guided by a semantic mask 215 such that a hole region of a specific semantic class can only be adjusted or affected by one or more outside regions of the same semantic class. This propagation process enables the inpainting model 400 to avoid artifacts caused by mixing the contexts of different semantic classes for large holes. In some embodiments, the propagation undergoes an iterative process of the Gaussian blur operation, which does not require any learnable parameter.

The image 200 is down-sampled to create a low-resolution (LR) version of the image 200. Each of a high-resolution (HR) version of the image 200 and the LR version of the image 200 are processed by the encoder 405. In some embodiments, to preserve reasonable structures and frames of indoor images, the encoder 405 uses the MSG-Conv 420 to sample the relevant contexts for aggregation within the convolution and to exclude irrelevant contexts. The MSG-Conv 420 is configured to check with the semantic mask 215 and the surface normal map 220 to ensure that irrelevant contexts are identified.

In some embodiments, the MSG-Conv 420 includes multiple MSG-Conv-based blocks, such as an MSG-Conv DownBlock 420a, an MSG-Conv UpBlock 420b, and an MSG-Conv Block 420c, at layers with smaller receptive fields in the encoder 405 and decoder 410 such that the sufficiency of relevant contexts can be fulfilled despite a limited receptive field. At some layers, the receptive field is larger, and one location on the image plane may correspond to multiple semantic classes and surfaces. In these cases, there is low necessity for using the MSG-Conv 420 to maintain the sufficiency of relevant contexts and the exquisite precision for the context aggregation. Therefore, in some embodiments, a conventional gated convolution 430 is utilized for these layers. In the MSG-Conv-based blocks, k denotes the kernel size, s denotes the stride, and θ is a specialized hyperparameter of MSG-Conv denoting the lower limit of contexts to be sampled. The digits following k, s, and θ are their values.

Inheriting the locality nature of the convolution, the MSG-Conv 420 incorporates the local relevant contexts. In some embodiments, the inpainting model 400 includes the MSG-Attn 425 located between the encoder 405 and the decoder 410, and the MSG-Attn 425 is configured to incorporate the global relevant contexts using the semantic mask 215 and the surface normal map 220. The MSG-Attn 425 samples and aggregates the existing most-relevant contexts for each location, which effectively reduces disturbances brought by irrelevant contexts. In some embodiments, the MSG-Attn 425 performs attention weight estimation using the feature maps from the down-sampled LR version of the image 200. The MSG-Attn 425 also applies 435 the estimated attention weights to aggregate the contexts in the HR version of the image 200. The trained encoder weights are shared at different resolutions. In some embodiments, the inpainting model 400 is trained using an L1 reconstruction loss.

In some cases, the feature map is based on a first subset of semantic code vectors, where the first subset of semantic code vectors includes (i) semantic code vectors for one or more portions of the image containing image data of the first semantic class and (ii) masked semantic code vectors for one or more portions of the image containing image data of the second semantic class. Also, in some cases, a second feature map is based on a second subset of semantic code vectors, where the second subset of semantic code vectors includes (i) semantic code vectors for the one or more portions of the image containing the image data of the second semantic class and (ii) masked semantic code vectors for the one or more portions of the image containing the image data of the first semantic class.

Although FIG. 4 illustrates one example of an inpainting model 400 with an encoder-decoder architecture, various changes may be made to FIG. 4. For example, the actual contents of the images being processed can vary widely.

Figure 5A:
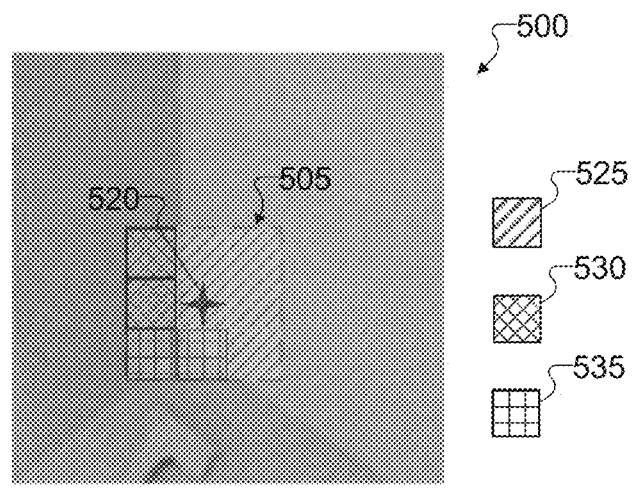
FIGS. 5A-5C illustrate example multimodal structural guidance context sampling within convolutions in accordance with this disclosure.
Figure 5B:
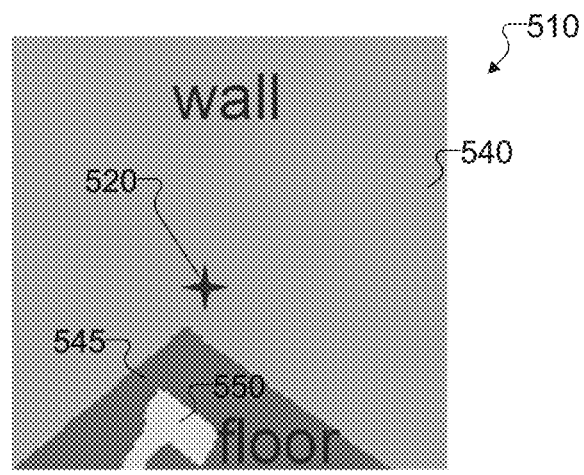
Figure 5C:
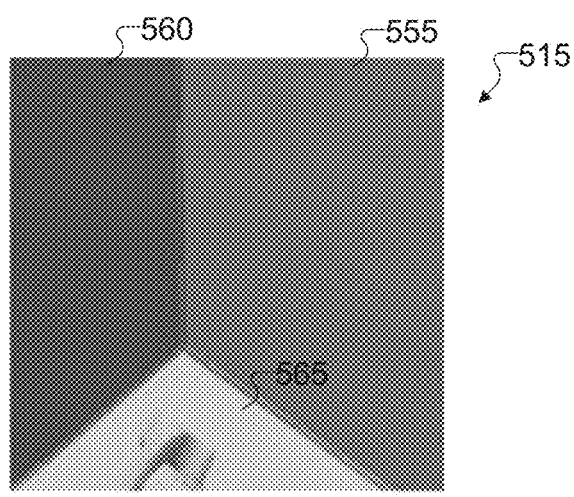

FIGS. 5A-5C illustrate example multimodal structural guidance context sampling within convolutions in accordance with this disclosure. For ease of explanation, the multimodal structural guidance context sampling may be described as being performed by the electronic device 101 in the network configuration 100 of FIG. 1. However, the multimodal structural guidance context sampling may be performed by any other suitable device (such as the server 106) and in any other suitable system.

In the example shown in FIG. 5A, an input image 500 to the convolutions is the output from the SG-Prop 415. The dotted box encloses a hole region 505 to be restored. A semantic mask 510 and a surface normal map 515 are applied as part of the MSG. A black cross marks the center of a reference pixel 520, and the surrounding squares are its contexts. Portions of the hole region 505 are separated into different relevance levels between two locations on the image plane and can be graded into three levels based on their affiliations with the semantic mask and the surface normal map. Again, the three levels are defined as: (i) "good" 525 (same semantic class and surface), (ii) "fair" 530 (same semantic class and different surfaces), (iii) "bad" 535 (different semantic classes).

FIG. 5B illustrates an example semantic mask 510 in which the input image 500 is separated into three categories. The three categories are a wall 540, a floor 545, and an object 550. FIG. 5C illustrates an example surface normal map 515 in which the input image 500 is separated into three categories 555, 560, and 565. By checking with the semantic mask 510 and surface normal map 515, the irrelevant contexts can be identified.

Although FIGS. 5A-5C illustrate examples of multimodal structural guidance context sampling within convolutions, various changes may be made to FIGS. 5A-5C. For example, the actual contents of the images being processed can vary widely.

Figure 6:
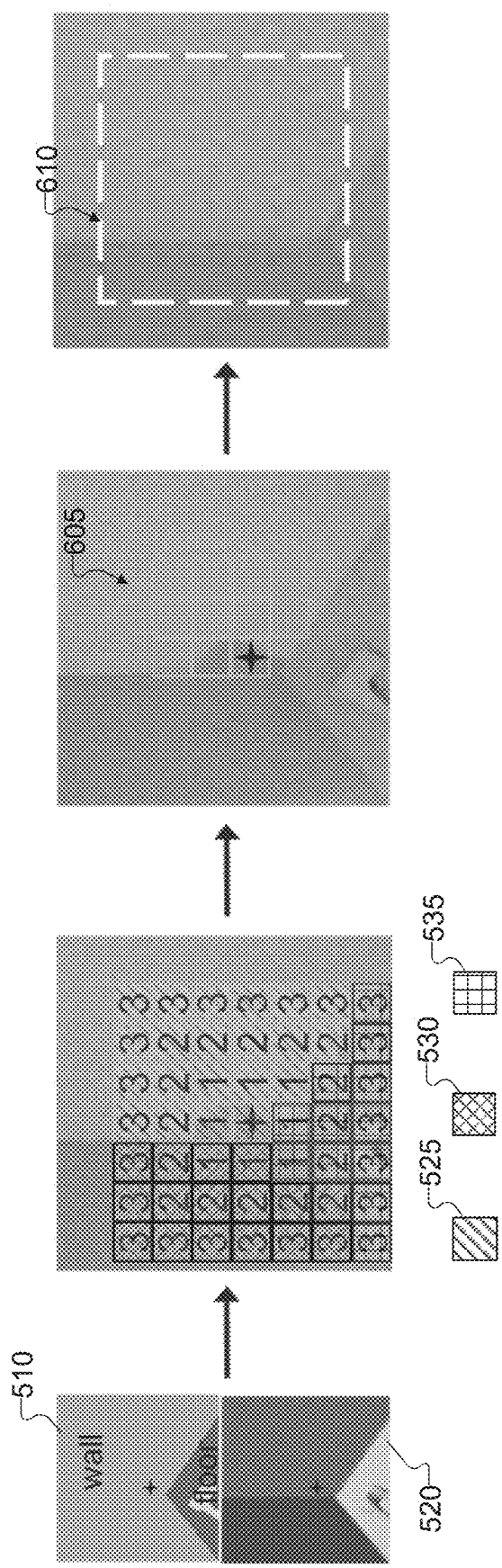
FIG. 6 illustrates an example multimodal structural guidance context sampling within convolutions process in accordance with this disclosure.

FIG. 6 illustrates an example multimodal structural guidance context sampling within convolutions process in accordance with this disclosure. For ease of explanation, the multimodal structural guidance context sampling may be described as being performed by the electronic device 101 in the network configuration 100 of FIG. 1. However, the multimodal structural guidance context sampling may be performed by any other suitable device (such as the server 106) and in any other suitable system.

In the example shown in FIG. 6, an image 500 output from the SG-Prop 415 is input to the MSG-Conv 420. The MSG-Conv 420 also obtains the semantic mask 510 and the surface normal map 515. In a first operation, the MSG-Conv 420 separates the contexts into different semantic classes, including the good 525, fair 530, and bad 535 classes. For example, the MSG-Conv 420 can use the semantic mask 510 and the surface normal map 520 to identify irrelevant contexts. The MSG-Conv 420 also identifies contexts based on a distance from the reference pixel 520. In some embodiments, all locations within an MSG-Conv kernel can be graded by their relationships with the kernel center under MSG. That is, the contexts are ordered by relevance and distance to the reference pixel 520 (kernel center) from "good" 525 to "bad" 535 and inside and out. In the example shown in FIG. 6, the number in the squares denotes the distance to the reference pixel 520.

In some embodiments, given the graded kernel locations, the contexts can be continuously sampled from the highest relevance to the lower, and inside and out, until a preset lower limit θ is reached. This may occur, for example, starting from the kernel center at the reference pixel 520, inside and out, circle by circle following the ascending order indicated by the number within each context. Therefore, the MSG-Conv 420 samples the relevant good contexts 605 in a circular pattern starting with those numbered 1 and then moves to those numbered 2. A large kernel includes enough contexts to ensure good contexts reach the lower limit. In the example shown in FIG. 6, there are twenty-one good 525 contexts. Since the number of good 525 contexts exceeds the lower limit θ=9, the MSG-Conv 420 samples the top two most relevant good contexts 605, which are numbered 1 and 2 in the example shown in FIG. 6. The MSG-Conv 420 terminates the sampling process prior to considering the lower contexts, which are numbered 3 in the example shown in FIG. 6.

In other examples, if the lower limit θ cannot be reached after sampling all good 525 contexts, the MSG-Conv 420 proceeds to sample the fair 530 contexts. If the lower limit θ still cannot be reached after sampling all fair 530 contexts, the MSG-Conv 420 terminates the sampling process prior to considering the bad 535 contexts. That is, when the sufficiency of relevant contexts nearby cannot satisfy the lower limit, the MSG-Conv 420 dynamically enlarges the receptive field without blending irrelevant contexts due to the multimodal structural guidance. Accordingly, the inpainting model 400 can restore the hole region 610.

In some embodiments, the MSG-Conv 420 is configured with a sampling strategy that not only guarantees the sufficiency of the relevant contexts but also blocks out the disturbances of the irrelevant contexts. Therefore, the MSG-Conv 420 is configured to produce fewer artifacts along object or category boundaries, such as between wall surfaces in the example image, as compared to gated convolution processes or deformable convolutional process. The convolution operations can restore image textures by aggregating local contexts from the outside of holes to the inside of the holes. Also, in some embodiments, to exploit the useful global contexts that are far away from the holes, the contextual attention mechanism, namely the MSG-Attn 425, aggregates and projects the information of the non-hole regions to the hole regions according to estimated patch similarities. For example, the MSG-Attn 425 can aggregate and project information based on attention weights, which can be computed according to:

$$s_{i,j} = \frac{\exp(\alpha \cdot \cos(h_i, h_j))}{\sum_{k}^{N} \exp(\alpha \cdot \cos(h_i, h_k))} \qquad (7)$$

In Equation (7), $h_i$ and $h_j$ denote the features at location i and j from the input feature maps, respectively, and $s_{i,j}$ denotes the attention weight of location i paid to location j. Additionally, $\cos(\cdot)$ represents the cosine similarity function, and $\alpha$ is a hyperparameter that enlarges the range of the cosine similarity and increases the attention paid to the relevant locations. In some cases, $\alpha$ is set to 10.

Due to the ignorance of an MSG, the attention weight estimation in Equation (7) may cause many false-relevant contexts in scenarios discussed in principle of relevance grading. In some embodiments, the MSG-Attn 425 is configured to address the issue of false-relevant contexts and sample and aggregate the existing most-relevant contexts by applying weights, such as those calculated according to:

$$s_{i,j} = \begin{cases} \dfrac{\exp(\alpha \cdot \cos(h_i, h_j)) \cdot \mathbb{1}^m(i,j) \cdot \mathbb{1}^n(i,j)}{\sum_{k}^{N} \exp(\alpha \cdot \cos(h_i, h_k)) \cdot \mathbb{1}^m(i,k) \cdot \mathbb{1}^n(i,k)} & \text{if } \Lambda > 0 \\ \dfrac{\exp(\alpha \cdot \cos(h_i, h_j)) \cdot \mathbb{1}^m(i,j)}{\sum_{k}^{N} \exp(\alpha \cdot \cos(h_i, h_k)) \cdot \mathbb{1}^m(i,k)} & \text{otherwise} \end{cases} \quad (8)$$

In Equation (8), $\Lambda$ denotes the total good contexts on the image plane, and $\mathbb{1}^m(i,j)$ and $\mathbb{1}^n(i,j)$ are defined in Equations (1) and (2) as two indicator functions. The value of Equation (3) means that when there exist good contexts ($\Lambda>0$), only good contexts may be sampled and aggregated, and the fair contexts may be ignored. In addition, when there are no good contexts ($\Lambda=0$), the fair contexts may be sampled and aggregated. Therefore, the MSG-Attn 425 only searches good contexts 525 and, regardless of how many good contexts 525 exist, the MSG-Attn 425 does not proceed to sample the fair contexts 530. For example, if the lower limit $\theta=9$ and there are only two good contexts 525, the MSG-Attn 425 only searches and samples the two good contexts 525.

Besides applying the estimated attention weights to aggregate the relevant contexts for hole regions on the feature level, the attention weights can be further used to enhance the hole regions on the output image by aggregating the contextual residuals between the reconstructed non-hole regions and the original input image.

Although FIG. 6 illustrates one example of a multimodal structural guidance context sampling within convolutions process, various changes may be made to FIG. 6. For example, the actual contents of the images being processed can vary widely.

Figure 7:
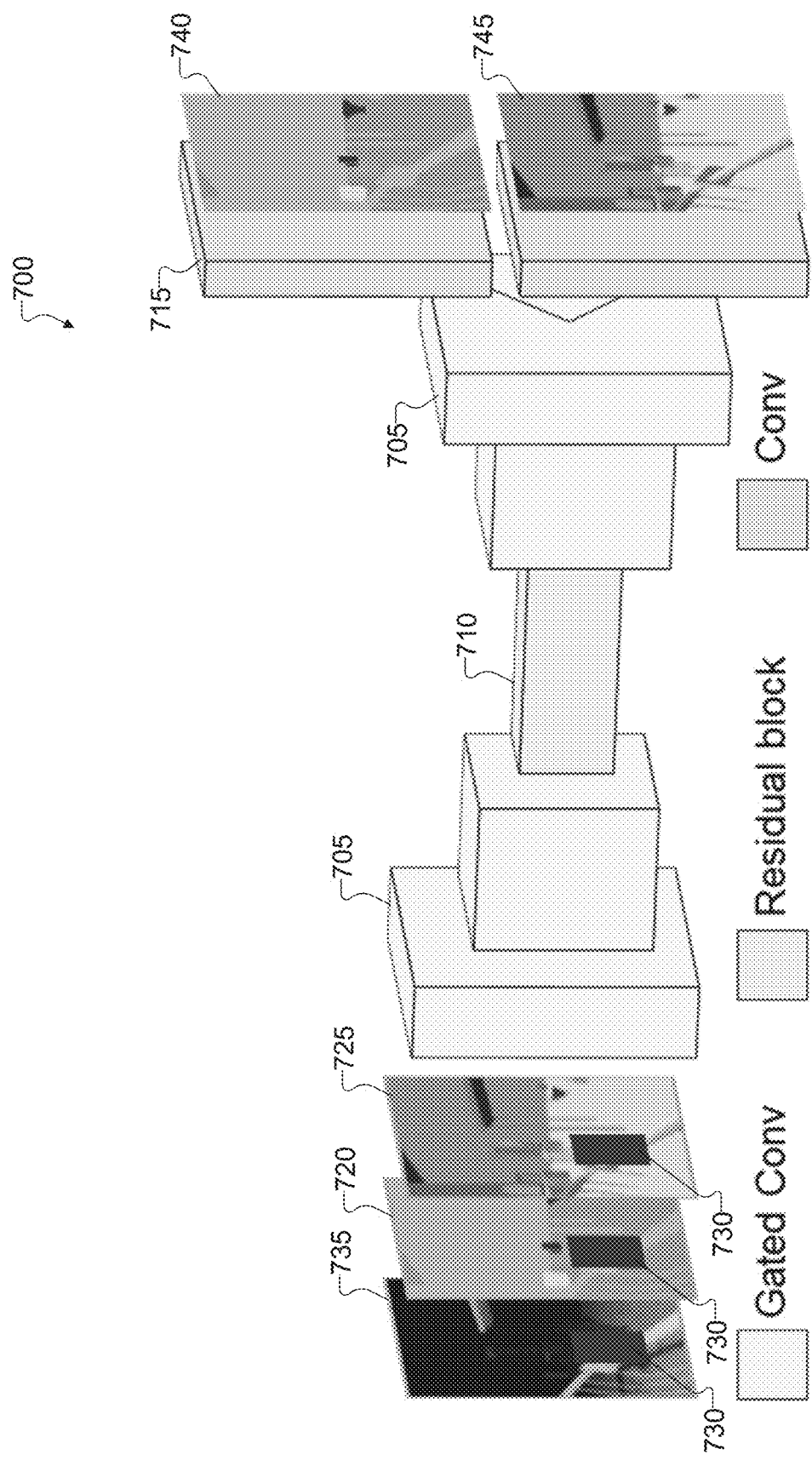
FIG. 7 illustrates an example restoration model in accordance with this disclosure.

FIG. 7 illustrates an example restoration model 700 in accordance with this disclosure. For ease of explanation, the restoration model 700 may be described as being used by the electronic device 101 in the network configuration 100 of FIG. 1. However, the restoration model 700 may be used by any other suitable device (such as the server 106) and in any other suitable system.

In some embodiments, a semantic mask and a surface normal map can be restored. For example, the semantic mask and the surface normal map can be restored by one or more users or by the restoration model 700. In the example shown in FIG. 7, the restoration model 700 includes a multimodal structure model based on an encoder-decoder architecture and includes a gated convolution circuit 705, a residual block circuit 710 disposed between two stages of the gated convolution circuit 705, and a convolution circuit 715 (such as a deformable convolutional process).

The restoration model 700 is configured to restore a semantic mask 720 and a surface normal map 725 with holes 730. The restoration model 700 receives, as input, a concatenation of a corrupted image 735, the semantic mask 720, and the surface normal 725. The corrupted image 735, the semantic mask 720, and the surface normal 725 are processed through two stages of the gated convolution circuit 705 and the residual block circuit 710. The output of the gated convolution circuit 705 is processed by the convolution circuit 715 to generate a hallucinated semantic mask 740 and a hallucinated surface normal 745. This restoration model 700 can be trained, such as by using the cross-entropy loss for the semantic mask and the L1 reconstruction loss for the surface normal map.

Although FIG. 7 illustrates one example of a restoration model 700, various changes may be made to FIG. 7. For example, the actual contents of the images being processed can vary widely.

Figure 8A:
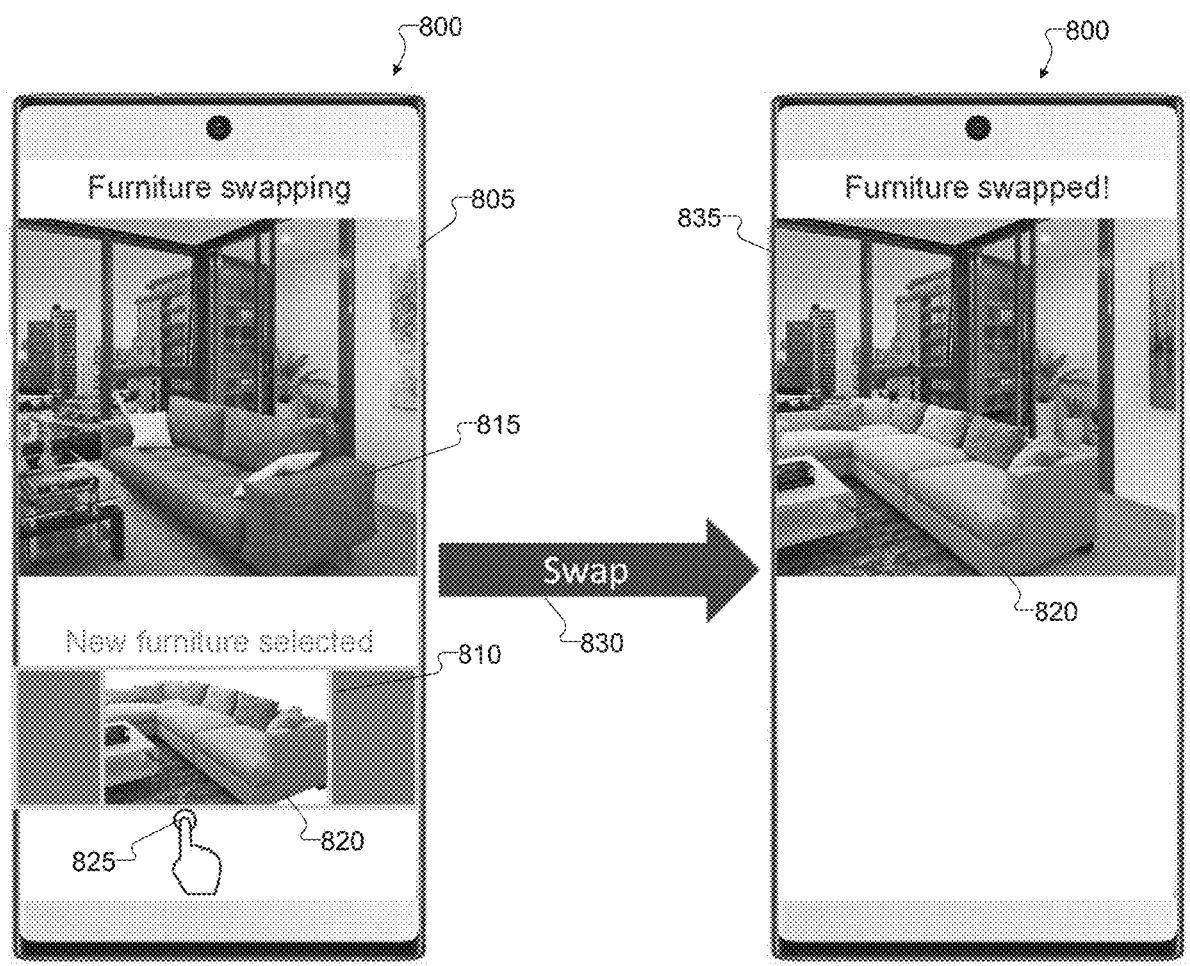
FIGS. 8A and 8B illustrate example results that may be obtained using layout-guided image inpainting in accordance with this disclosure.
Figure 8B:
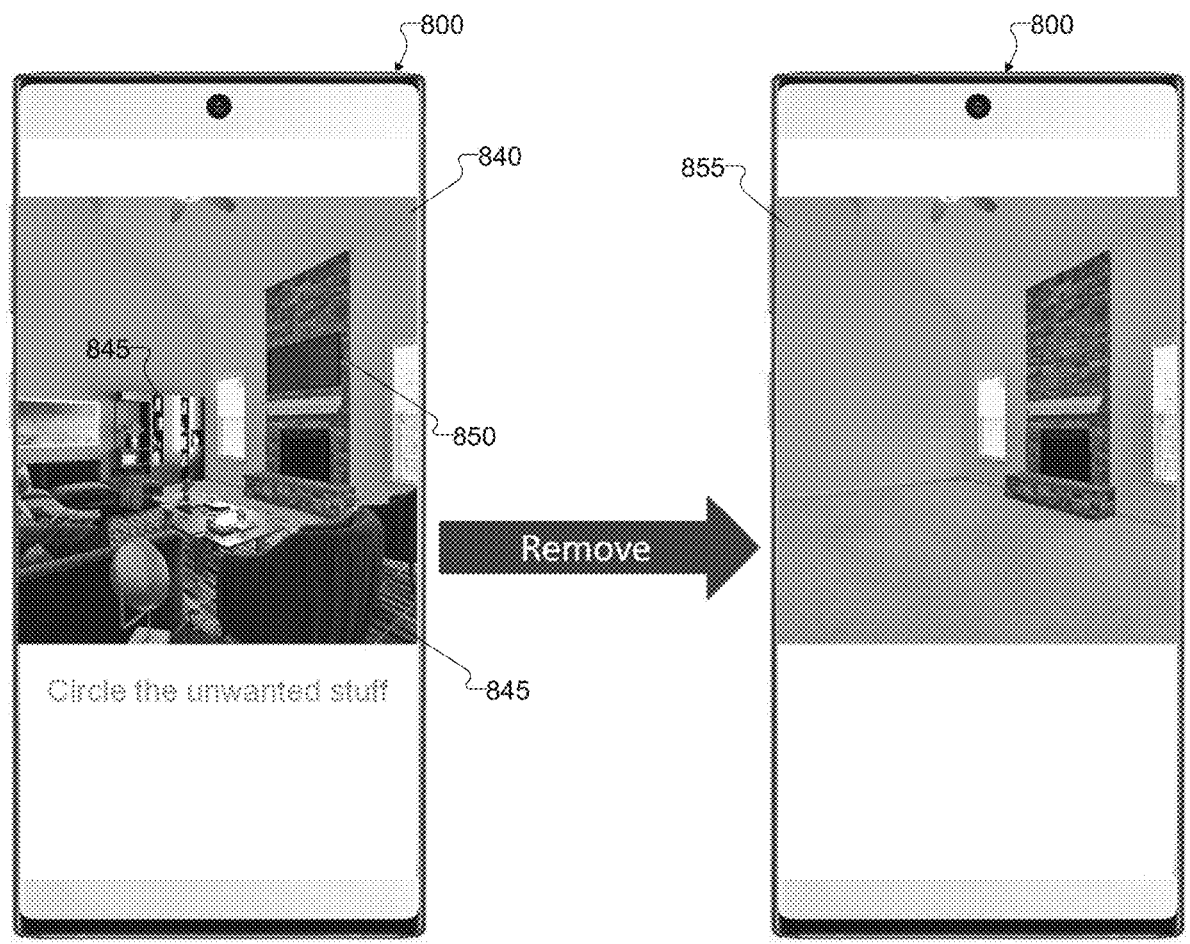

FIGS. 8A and 8B illustrate example results that may be obtained using layout-guided image inpainting in accordance with this disclosure. In the example illustrated in FIG. 8A, a mobile device 800 displays a first image 805 and a second image 810. The images 805 and 810 may, for example, be captured using one or more imaging sensors 180 of the electronic device 101. Alternatively, one or both of the images 805 and 810 may be electronically transferred to the mobile device 800. In this example, the first image 805 includes a space having objects, such as current furniture 815, and the second image 810 includes a piece of new furniture 820 that a user may desire to place in the first image 805 to assist the user to appreciate how the piece of new furniture 820 would appear in the space. The user selects, such as via input button 825, the new furniture 820 in order to instruct the mobile device 800 to render the piece of new furniture 820 from the second image 810 in place of the current furniture 815 in the first image 805. In response, the mobile device 800 swaps 830 the furniture in the first image 810, such as by using a machine learning model performing an indoor inpainting process. The indoor inpainting process generates a third image 835 in which the piece of new furniture 820 from the second image 810 is rendered in place of the current furniture 815.

In the example illustrated in FIG. 8B, the mobile device 800 displays a fourth image 840. The fourth image 840 may, for example, be captured using one or more imaging sensors 180 of the electronic device 101. Alternatively, the fourth image 840 may be electronically transferred to the mobile device 800. In this example, the fourth image 840 includes a space having objects, such as furniture 845 and wall hangings 850. The user may desire to see how the space in the image would appear without furniture. The user selects, such as by circling, the furniture 845 and wall hangings 850. As an example, the user can draw one or more circles around the furniture 845 and wall hangings 850 using a touch input on a touchscreen on the display 160 of the electronic device. In response to the user input, the mobile device 800 removes the furniture 845 and wall hangings 850 within the circles, such as by using a machine learning model performing an indoor inpainting process. The indoor inpainting process generates a fifth image 855 in which the furniture 845 and wall hangings 850 have been removed.

Although FIGS. 8A and 8B illustrate examples of results that may be obtained using layout-guided image inpainting, various changes may be made to FIGS. 8A and 8B. For example, the contents of the images 805, 810, and 815 and the contents to be inserted or removed are for illustration only and are merely meant to show how an indoor inpainting process may occur. Since images can vary greatly and machine learning models can be trained in different ways, the actual results obtained in any specific implementation of the neural network and the indoor inpainting process can vary.

Figure 9:
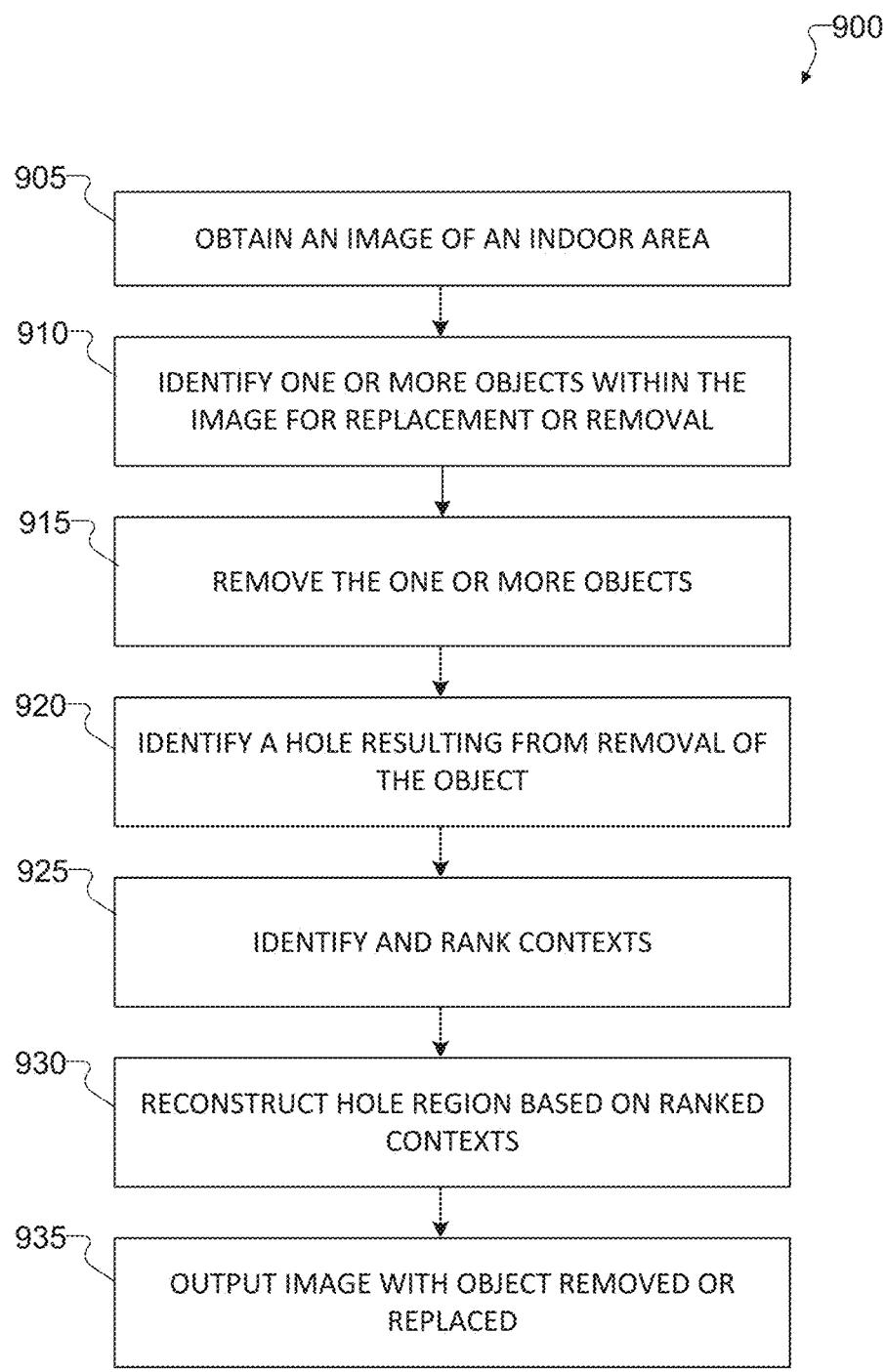
FIG. 9 illustrates an example method for indoor image inpainting in accordance with this disclosure.

FIG. 9 illustrates an example method 900 for indoor image inpainting in accordance with this disclosure. For ease of explanation, the method 900 is described as being performed within the network configuration 100 of FIG. 1, such as by the electronic device 101 or the server 106. However, the method 900 may be performed using any other suitable devices and in any other suitable systems.

As shown in FIG. 9, an indoor inpainting system, such as the inpainting model 225, obtains an image of an indoor area at block 905. This may include, for example, the processor 120 of the electronic device 101, server 106, or other device executing the inpainting model 225, capturing an image of an indoor area, downloading an indoor image from another computer system or network, or retrieving an indoor image from a memory.

The inpainting model 225 identifies one or more objects within the image for replacement or removal in operation 910. The one or more objects may be identified in response to a user input, such as on a touchscreen display. In some embodiments, the one or more objects are identified based on a placement of another object in an overlapping space of at least a portion of the one or more objects. For example, when a user places an object in the indoor image, the inpainting model 225 may identify if one or more portions of one or more objects in the area overlap the newly placed object and identifies the object(s) having any portion(s) that overlap one or more portions of the newly placed object.

In operation 915, the inpainting model 225 removes the one or more objects that were identified in operation 905. For example, the inpainting model 225 may identify respective contour edges of the one or more objects and remove (delete) pixels corresponding to the one or more identified objects. In operation 920, the inpainting model 225 identifies one or more hole regions resulting from the removal of the one or more objects. For example, the inpainting model 225 can use auxiliary multimodal structures, such as a semantic mask 215 and a surface normal map 220, to guide the inpainting model 225 to generate reasonable structures and frames for the one or more hole regions.

The inpainting model 225 identifies and ranks contents of regions outside the hole region(s) in operation 925. For example, using MSG, the inpainting model 225 can precisely sample relevant locations from regions outside each hole region on the image plane and project the information of the sampled relevant contexts to generate content for that hole region. The inpainting model 225 may also perform an MSG convolution and apply an MSG attention mechanism to produce a refined image. Under MSG, the relevance between two locations on the image plane can be graded into multiple levels based on their affiliations with semantic classes and surfaces.

In operation 930, the inpainting model 225 reconstructs the hole region(s) based on the ranked contexts. For example, the indoor image can be processed through a layout-guided pre-processing model in which neighboring contexts are aggregated, based on the ranking, as the content for each hole region. In some cases, the inpainting model 225 samples and aggregates the existing most relevant contexts for each location. In some embodiments, the inpainting model 225 performs attention weight estimation using feature maps from a down-sampled LR version of the indoor image, and the inpainting model 225 applies the estimated attention weights to aggregate the contexts in a HR version of the indoor image.

In operation 935, the inpainting model 225 outputs a refined image having the one or more objects removed and/or replaced with the new object. For example, the HR and LR versions of the indoor image, as processed through MSG conversion, attention, and weighting, can be combined and decoded, according to the semantic mask 215 and the surface normal map 220, to generate the refined image. In the refined image, the one or more objects are removed, and the newly placed object is included.

Although FIG. 9 illustrates one example of a method 900 for indoor image inpainting, various changes may be made to FIG. 9. For example, while shown as a series of steps, various steps in FIG. 9 may overlap, occur in parallel, occur in a different order, or occur any number of times.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Although this disclosure has been described with example embodiments, various changes and modifications may be suggested to one skilled in the art. It is intended that this disclosure encompass such changes and modifications as fall within the scope of the appended claims.

What is claimed is:

1. An inpainting method comprising:
   obtaining image information at an electronic device, wherein the image information identifies an area corresponding to a removed object within an image;
   reconstructing the area corresponding to the removed object by:
   applying a semantic mask and a surface normal map to identify and rank neighboring contexts of the area; and
   sampling, using an attention mechanism, the ranked contexts to generate pixel information for the area; and
   rendering the image with the reconstructed area.

2. The inpainting method of claim 1, wherein applying the semantic mask and the surface normal map comprises:
   applying a multimodal structural guidance (MSG)-based convolution to identify and rank the neighboring contexts of the area.

3. The inpainting method of claim 2, wherein identifying and ranking the neighboring contexts comprises:
   setting a reference pixel within the area;
   identifying the neighboring contexts based on a distance from the reference pixel; and
   grading each of the neighboring contexts based on a relationship between the reference pixel and the neighboring context.

4. The inpainting method of claim 3, wherein sampling the ranked contexts comprises:
   continuously sampling from a highest relevance grade and closest distance to a lower relevance grade and further distance.

5. The inpainting method of claim 3, wherein applying the MSG-based convolution comprises:
   for each portion of the image that does not include at least part of the area, generating a semantic class label and a surface vector for the portion of the image;

for each portion of the image that does include at least part of the area, (i) identifying a semantic class of a plurality of semantic classes associated with the portion of the image and (ii) generating a surface vector for the portion of the image based on one or more neighboring semantic code vectors associated with the identified semantic class; and based on the semantic class label, determining which portions of the image belong to a same class and a same surface.

6. The inpainting method of claim 5, wherein sampling the ranked contexts comprises:

sampling and aggregating most relevant contexts based on a ranking of the ranked contexts;

estimating an attention weight to apply to the sampled contexts based on at least one feature map; and propagating portions of the weighted contexts into the area.

7. The inpainting method of claim 6, wherein the at least one feature map comprises at least one of:

a first feature map based on a first subset of semantic code vectors, the first subset of semantic code vectors including (i) semantic code vectors for one or more portions of the image containing image data of a first semantic class and (ii) masked semantic code vectors for one or more portions of the image containing image data of a second semantic class; and a second feature map based on a second subset of semantic code vectors, the second subset of semantic code vectors including (i) semantic code vectors for the one or more portions of the image containing the image data of the second semantic class and (ii) masked semantic code vectors for the one or more portions of the image containing the image data of the first semantic class.

8. An apparatus comprising:

at least one processor configured to:

obtain image information, wherein the image information identifies an area corresponding to a removed object within an image;

reconstruct the area corresponding to the removed object, wherein, to reconstruct the area, the at least one processor is configured to:

apply a semantic mask and a surface normal map to identify and rank neighboring contexts of the area; and sample, using an attention mechanism, the ranked contexts to generate pixel information for the area; and render the image with the reconstructed area.

9. The apparatus of claim 8, wherein, to apply the semantic mask and the surface normal map, the at least one processor is configured to apply a multimodal structural guidance (MSG)-based convolution to identify and rank the neighboring contexts of the area.

10. The apparatus of claim 9, wherein, to identify and rank the neighboring contexts, the at least one processor is configured to:

set a reference pixel within the area;

identify the neighboring contexts based on a distance from the reference pixel; and grade each of the neighboring contexts based on a relationship between the reference pixel and the neighboring context.

11. The apparatus of claim 10, wherein, to sample the ranked context, the at least one processor is configured to continuously sample from a highest relevance grade and closest distance to a lower relevance grade and further distance.

12. The apparatus of claim 10, wherein, to apply the MSG-based convolution, the at least one processor is configured to:

for each portion of the image that does not include at least part of the area, generate a semantic class label and a surface vector for the portion of the image;

for each portion of the image that does include at least part of the area, (i) identify a semantic class of a plurality of semantic classes associated with the portion of the image and (ii) generate a surface vector for the portion of the image based on one or more neighboring semantic code vectors associated with the identified semantic class; and based on the semantic class label, determine which portions of the image belong to a same class and a same surface.

13. The apparatus of claim 12, wherein, to sample the ranked contexts, the at least one processor is configured to:

sample and aggregate most relevant contexts based on a ranking of the ranked contexts;

estimate an attention weight to apply to the sampled contexts based on at least one feature map; and propagate portions of the weighted contexts into the area.

14. The apparatus of claim 13, wherein the at least one feature map comprises at least one of:

a first feature map based on a first subset of semantic code vectors, the first subset of semantic code vectors including (i) semantic code vectors for one or more portions of the image containing image data of a first semantic class and (ii) masked semantic code vectors for one or more portions of the image containing image data of a second semantic class; and a second feature map based on a second subset of semantic code vectors, the second subset of semantic code vectors including (i) semantic code vectors for the one or more portions of the image containing the image data of the second semantic class and (ii) masked semantic code vectors for the one or more portions of the image containing the image data of the first semantic class.

15. A non-transitory computer readable medium containing instructions that when executed cause at least one processor to:

obtain image information, wherein the image information identifies an area corresponding to a removed object within an image;

reconstruct the area corresponding to the removed object, wherein the instructions that when executed cause the at least one processor to reconstruct the area include instructions that when executed cause the at least one processor to:

apply a semantic mask and a surface normal map to identify and rank neighboring contexts of the area; and sample, using an attention mechanism, the ranked contexts to generate pixel information for the area; and render the image with the reconstructed area.

16. The non-transitory computer readable medium of claim 15, wherein the instructions that when executed cause the at least one processor to apply the semantic mask and the surface normal map comprise instructions that when executed cause the at least one processor to apply a multimodal structural guidance (MSG)-based convolution to identify and rank the neighboring contexts of the area and use the MSG-based convolution to:
set a reference pixel within the area;
identify the neighboring contexts based on a distance from the reference pixel; and
grade each of the neighboring contexts based on a relationship between the reference pixel and the neighboring context.

17. The non-transitory computer readable medium of claim 16, wherein the instructions that when executed cause the at least one processor to sample the ranked context comprise:
instructions that when executed cause the at least one processor to continuously sample from a highest relevance grade and closest distance to a lower relevance grade and further distance.

18. The non-transitory computer readable medium of claim 16, wherein the instructions that when executed cause the at least one processor to perform the MSG-based convolution comprise instructions that cause the at least one processor to:
for each portion of the image that does not include at least part of the area, generate a semantic class label and a surface vector for the portion of the image;
for each portion of the image that does include at least part of the area, (i) identify a semantic class of a plurality of semantic classes associated with the portion of the image and (ii) generate a surface vector for the portion of the image based on one or more neighboring semantic code vectors associated with the identified semantic class; and based on the semantic class label, determine which portions of the image belong to a same class and a same surface.

19. The non-transitory computer readable medium of claim 18, wherein the instructions that when executed cause the at least one processor to sample the ranked contexts using the attention mechanism comprise instructions that when executed cause the at least one processor to:
sample and aggregate most relevant contexts based on a ranking of the ranked contexts;
estimate an attention weight to apply to the sampled contexts based on at least one feature map; and
propagate portions of the weighted contexts into the area.

20. The non-transitory computer readable medium of claim 19, wherein the at least one feature map comprises at least one of:
a first feature map based on a first subset of semantic code vectors, the first subset of semantic code vectors including (i) semantic code vectors for one or more portions of the image containing image data of a first semantic class and (ii) masked semantic code vectors for one or more portions of the image containing image data of a second semantic class; and
a second feature map based on a second subset of semantic code vectors, the second subset of semantic code vectors including (i) semantic code vectors for the one or more portions of the image containing the image data of the second semantic class and (ii) masked semantic code vectors for the one or more portions of the image containing the image data of the first semantic class.

* * * * *